United States Patent
Nelson et al.

(10) Patent No.: US 12,542,512 B2
(45) Date of Patent: Feb. 3, 2026

(54) MOUNT FOR INSTALLING A PHOTOVOLTAIC PANEL OR A SOLAR CELL ON A SHINGLED ROOF

(71) Applicants: Preston Nelson, Mount Vernon, IL (US); Matthew Brendel, Mascoutah, IL (US)

(72) Inventors: Preston Nelson, Mount Vernon, IL (US); Matthew Brendel, Mascoutah, IL (US)

(*) Notice: Subject to any disclaimer, the term of this patent is extended or adjusted under 35 U.S.C. 154(b) by 25 days.

(21) Appl. No.: 18/613,442

(22) Filed: Mar. 22, 2024

(65) Prior Publication Data
US 2024/0322741 A1   Sep. 26, 2024

Related U.S. Application Data

(60) Provisional application No. 63/454,491, filed on Mar. 24, 2023.

(51) Int. Cl.
  *H02S 20/32*   (2014.01)
  *H02S 20/23*   (2014.01)
(52) U.S. Cl.
  CPC .................................. *H02S 20/23* (2014.12)
(58) Field of Classification Search
  None
  See application file for complete search history.

(56) References Cited

U.S. PATENT DOCUMENTS

| | | | | |
|---|---|---|---|---|
| 825,661 | A * | 7/1906 | Knepley | E04G 3/26 248/237 |
| 893,123 | A * | 7/1908 | Appleton | E04G 3/26 248/237 |
| 4,987,720 | A * | 1/1991 | Wozney, Jr. | E04D 15/02 52/DIG. 1 |
| 8,839,575 | B1 * | 9/2014 | Liu | F24S 25/613 52/173.3 |
| 8,844,887 | B2 * | 9/2014 | Genschorek | F24S 25/613 52/90.2 |
| 2016/0105143 | A1 * | 4/2016 | Johansen | F24S 25/61 248/237 |
| 2021/0285596 | A1 * | 9/2021 | Affentranger, Jr | F16M 13/02 |
| 2022/0372762 | A1 * | 11/2022 | Gallegos | F16M 13/02 |
| 2023/0336108 | A1 * | 10/2023 | Morano | F24S 25/613 |
| 2024/0266987 | A1 * | 8/2024 | Wentworth | F24S 25/61 |

* cited by examiner

*Primary Examiner* — Steven M Marsh
(74) *Attorney, Agent, or Firm* — Sandberg Phoenix & von Gontard, P.C.

(57) ABSTRACT

A mount for installing a photovoltaic array on a shingle roof includes a base and a first support panel and second support panel that extend upwardly from the base. The base has one or more openings that accept fasteners to secure the base to a roof surface with the fasteners positioned entirely underneath a shingle of the roof positioned above the fasteners. The fasteners are therefore concealed by the shingle and protected by the shingle. A rail panel extends between the first support panel and the second support panel above the base. The rail panel is provided with fastener holes for use in mounting a rail to the rail panel.

20 Claims, 5 Drawing Sheets

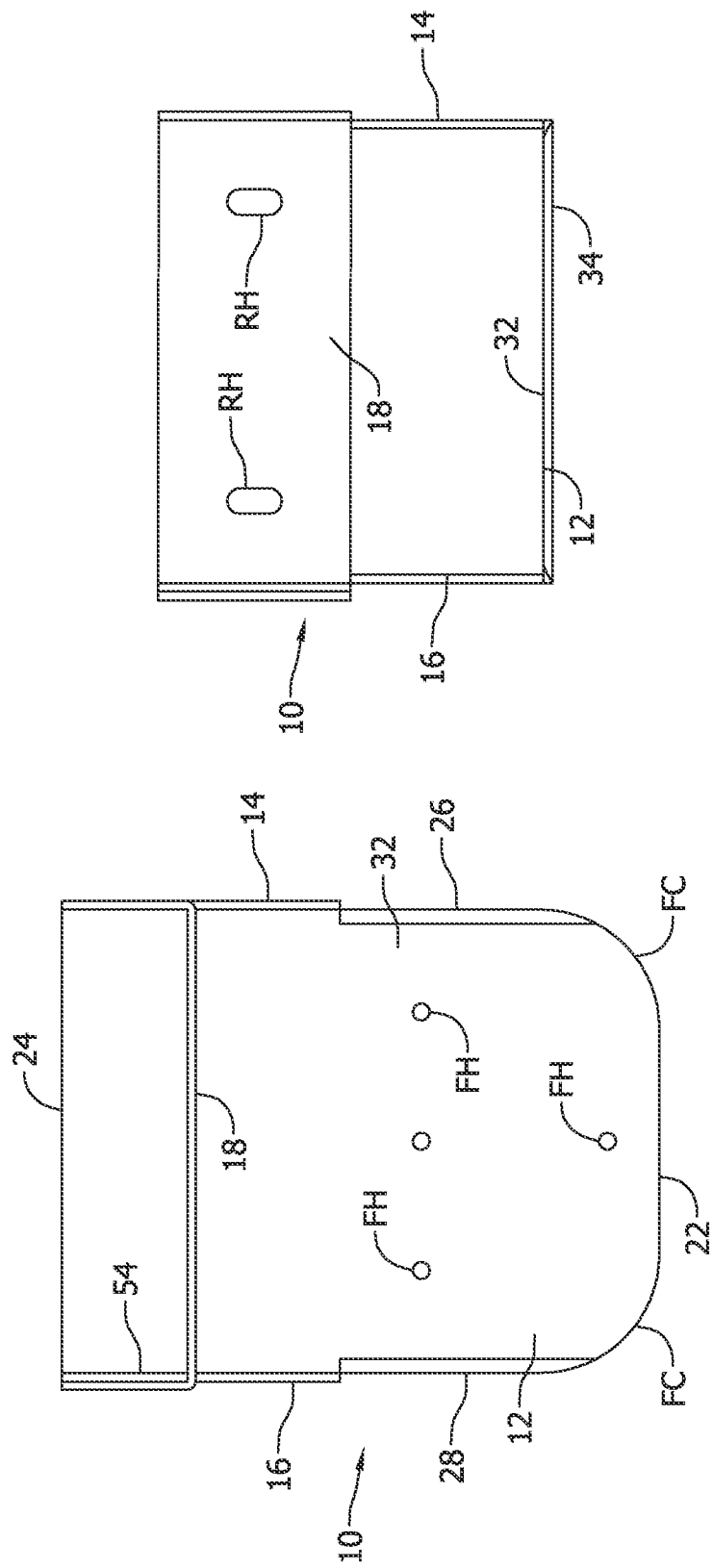

MOUNT FOR INSTALLING A PHOTOVOLTAIC PANEL OR A SOLAR CELL ON A SHINGLED ROOF

CROSS-REFERENCE TO RELATED APPLICATIONS

This application claims the benefit of the filing date of U.S. Provisional Patent Application Ser. No. 63/454,491, which was filed on Mar. 24, 2023.

FIELD OF THE INVENTION

This disclosure is directed to a mount that is designed for installing a panel on a roof. More specifically, this disclosure is directed to a mount for installing a photovoltaic panel or solar cell on a shingled roof. The mount includes a base that is configured to be positioned between a pair of overlapping shingles and beneath the upper shingle, and secured by a fastener or fasteners to the roof structure. The upper shingle covers the fasteners securing the base of the mount to the roof structure and prevents melting snow or rain from accessing the fastener holes. Thereby, the mount prevents melting snow or rainwater leakage through the fastener holes securing the mount to the roof structure.

BACKGROUND OF THE INVENTION

The installation of a roof mounted photovoltaic array typically involves numerous components in addition to the photovoltaic modules or solar cells that make up the array. For example, components such as rails are used to support the photovoltaic modules on the roof. The rails run horizontally or vertically across the plane of the roof surface. Clamps are used on the rails to attach individual photovoltaic modules to the rails. Mounts attach to the roof and to the rails and support the rails on the roof surface.

Currently available photovoltaic modules, clamps, and rails have relatively uniform constructions. However, the mounts used in the installation of photovoltaic arrays on a roof surface have various different types of constructions and are not uniform.

Large photovoltaic arrays are of a significant size. The size of the photovoltaic array is susceptible to lift forces from strong winds. Strong winds can pass between the arrays and the roof surface on which the arrays are mounted and exert forces that can lift the arrays off the roof surface. To provide a secure attachment of a photovoltaic array to a roof surface, most mounts that mount arrays to roof surfaces feature a fastener bolt that penetrates through all roofing surfaces and into a structural truss beneath the roofing surfaces. For this reason, melting snow or rainwater leakage at the locations of the fastener bolts is a major concern. Melting snow or rainwater can leak along the fasteners and through the roof surface to the underside of the roof surface. The potential for roof leakage deters many homeowners from adopting solar energy.

Numerous devices have been developed for protecting the fastener bolts from the elements and melting snow or rain water leakage. Examples of these are disclosed in the U.S. patent Publication of Truthseeker No. 2018/0167020; the U.S. patent Publication of Pretorius et al. No. 2019/0006982; the U.S. patent Publication of Bamat et al. No. 2019/0013772; the U.S. patent Publication of Wildes No. 2022/0255494; the U.S. patent of Nash et al. U.S. Pat. No. 10,801,209 and the U.S. patent of Meine U.S. Pat. No. 11,486,133.

Contrary to the past devices such as those disclosed in the above referenced patent publications and patents, the construction of the mount of this disclosure conceals fasteners entirely within the flashing that lays underneath a shingle above the fastener. Therefore, for as long as the roof maintains its good function in repelling melting snow or rainwater, a shingle will cover over the fasteners securing the mount to the roof structure and the mount of this disclosure will not leak, and the fastener areas of the mount will not be exposed to the elements.

SUMMARY OF THE INVENTION

This disclosure relates to flashing style mounts for shingled roofs, particularly as is used to install a photovoltaic array. The first primary component of the mount is a lower portion flashing or base. The base includes at least one opening which accepts a fastener to secure the mount to the roof. The flashing or base and its opening(s) with fastener(s) are installed entirely beneath the shingle above the mount, in order for the shingle to cover the opening(s) and fastener(s).

The second primary component of the mount is an upper portion or rail panel. The rail panel also features an opening or openings for attachment to a rail system, such that the rail panel will allow photovoltaic modules to be clamped onto the rails.

The mount for installing a photovoltaic panel on a shingled roof of this disclosure is basically comprised of a base, a first support panel, a second support panel and a rail panel. The base, first support panel, second support panel and rail panel are all formed integrally from a flat blank or a flat sheet of material, for example sheet metal, and are then bent and formed into the three dimensional mount of this disclosure.

The base has a flat, rectangular configuration with a length dimension between a bottom edge and a top edge of the base, and a width dimension between a first side edge and a second side edge of the base. There is at least one fastener hole through the base adjacent to the top edge of the base.

The first support panel has a flat, planar configuration and is secured to the base at a bend along the first side edge of the base. The first support panel is positioned adjacent to the bottom edge of the base and extends upwardly from the base at a right angle relative to the base.

The second support panel has a flat, planar configuration and is secured to the base at a bend along the second side edge of the base. The second support panel is positioned adjacent to the bottom edge of the base and extends upwardly from the base at a right angle relative to the base.

The rail panel is secured to the first support panel and the second support panel above the base. The rail panel extends between the first support panel and the second support panel and over the base. The first support panel and the second support panel position the rail panel spaced above the base with the rail panel at a right angle relative to the base. There is at least one fastener hole, and preferably two fastener holes through the rail panel. The fastener holes receive fasteners used to secure a the rail panel and the mount to a rail supporting a photovoltaic array.

BRIEF DESCRIPTION OF DRAWINGS

Further features of the mount for installing a photovoltaic panel on a shingled roof are set forth in the following detailed description and in the drawing figures.

FIG. 2 is a top plan view of the mount of this disclosure, showing thickness dimensions of the vertical first and second support panels and the uppermost rail panel which connects the support panels and contains the fastener hole(s) for attachment to a rail. It is a representation of a top plan view of the mount of this disclosure formed by bending the blank or flat piece of material of FIG. 1.

FIG. 3 is a view of the mount, showing the thickness dimensions of the lower base, the vertical first and second support panels, and the face of the rail panel. It is a representation of a front elevation view of the mount of FIG. 2.

FIG. 6 is a representation of a side elevation view of the mount with the base operatively attached to a shingled roof.

FIG. 7 is a representation of a perspective view of the mount installed on a shingles roof.

DETAILED DESCRIPTION OF THE INVENTION

The concept of this invention is to provide a simple and synergistic mount and mounting method for installing a photovoltaic array or solar cells on an existing asphalt shingle roof. Rather than relying on increasingly complex penetration protections which are ultimately susceptible to leaking, the present embodiment relies on a unique construction of a mount 10 that locates fastener penetrations only within a portion of flashing or the mount base which is located underneath a shingle layer. Thus, not all layers of roofing are penetrated, the roof's integrity is maintained, and the shingle's elemental protection will thus extend to the mounts flashing or base penetrations, protecting them against leakage for the entirety of the life of the roof.

The mount of this disclosure has a simplified construction that enables the amount to be quickly and inexpensively fabricated, even from a single sheet of metal, although economies of scale may as well permit similar models of alternative formation, such as cast aluminum. Installation of a mount includes: 1. Sliding the lower flashing portion or base of the mount under a shingle until the entire flashing portion or base with fastener openings locates underneath the shingle; 2. Lifting the shingle; 3. Inserting fasteners through the fastener openings in the base and penetrating the fasteners into the roof structure; 4. Replacing or lowering the shingle so that it covers the fastener penetrations. For roof slopes that are more level, it may also be desirable to apply a hydrophobic rubber sealant between the flashing or base and the shingles, to prevent water from creeping underneath the shingles.

Figure 1:
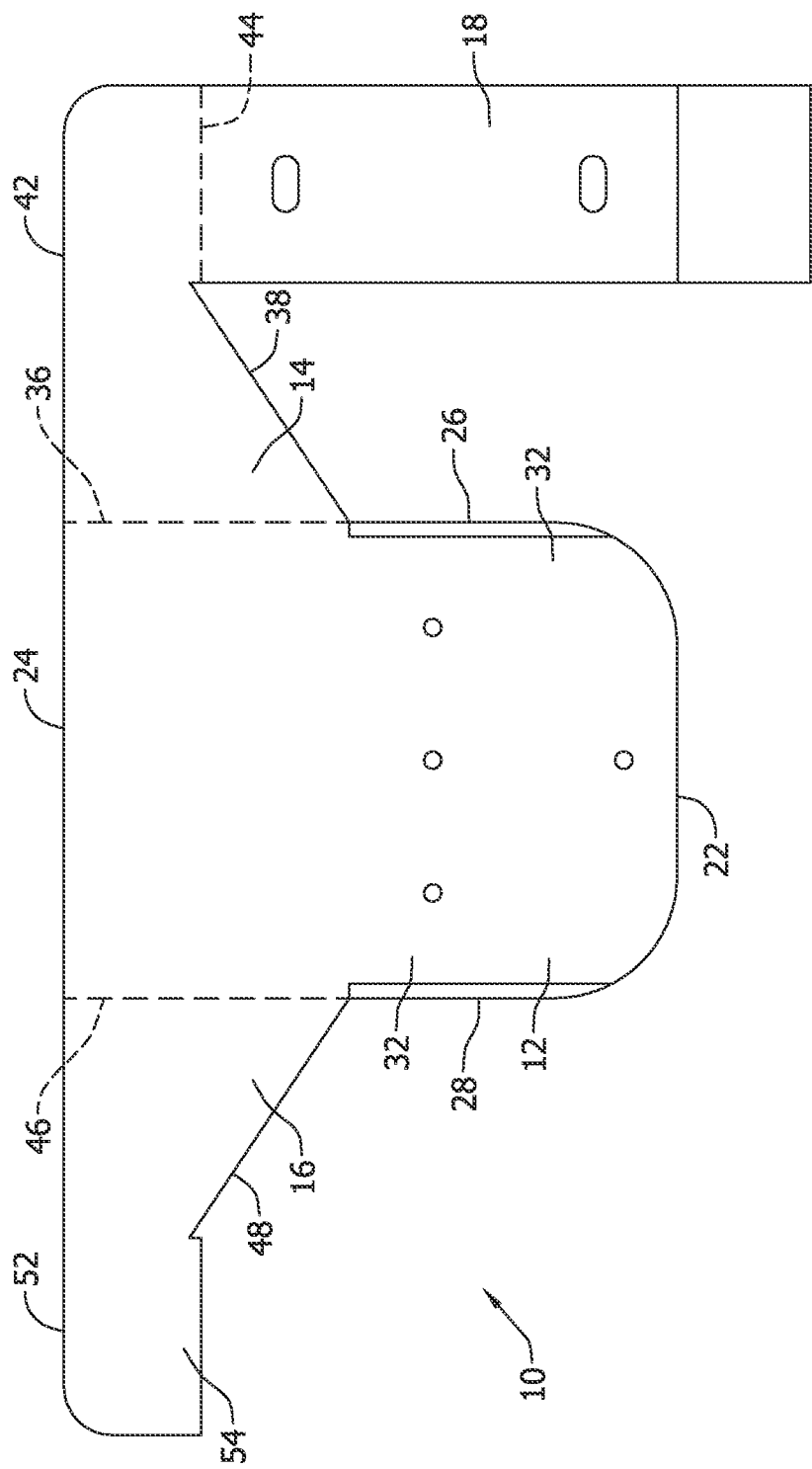
FIG. 1 is a top plan view of a flat piece of material, such as metal as it may be cut from sheet metal. It is a representation of a plan view of a flat blank of the base, first support panel, second support panel and rail panel of the mount of this disclosure formed integrally as a unit from a flat piece of material.

FIG. 1 is a representation of the mount 10 of this disclosure. In FIG. 1 the mount 10 is represented as a blank cut from a flat sheet of material in its planar configuration prior to the mount being formed or bent into a functional 3 dimensional configuration of the mount. As represented in FIG. 1, the mount 10 is comprised of a base 12, a first support panel 14, a second support panel 16 and a rail panel 18. The base 12, the first support panel 14, the second support panel 16 and the rail panel 18 are all unitarily connected and formed in a unitary, integral configuration from a flat sheet of material, for example sheet metal. However, other equivalent types of materials can be employed in the construction of the mount 10 of this disclosure. For example, composite materials, plastic materials and other equivalent types of materials that provide the mount 10 with sufficient structural strength for its intended functioning can be employed in the construction of the mount 10. Additionally, it is not necessary that the mount 10 be constructed from a flat blank of material.

Figure 5:
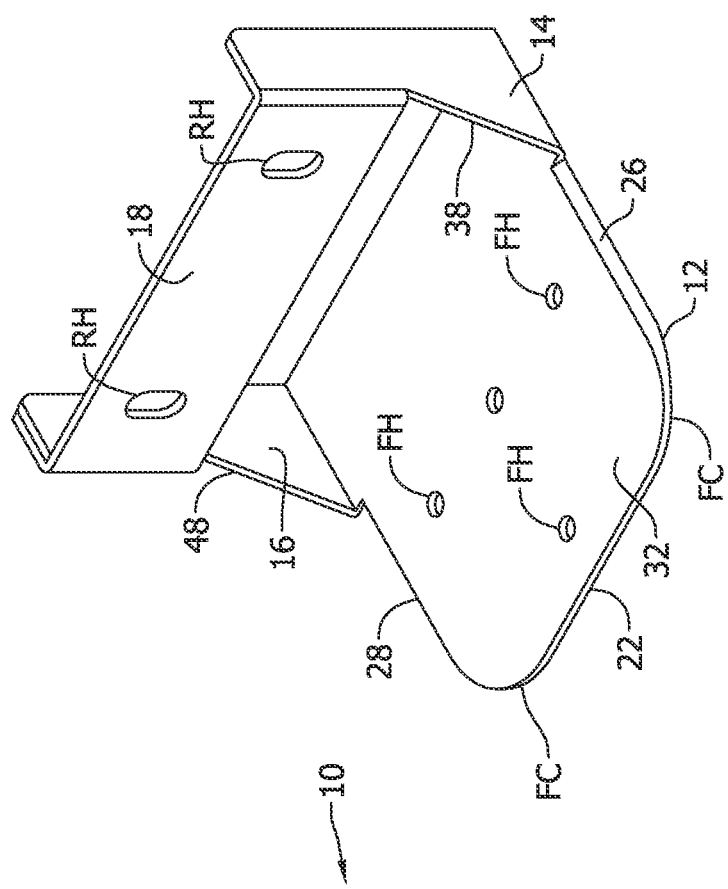
FIG. 5 is a three-dimensional representation of the mount. It is a representation of a perspective view of the mount.
Figure 4:
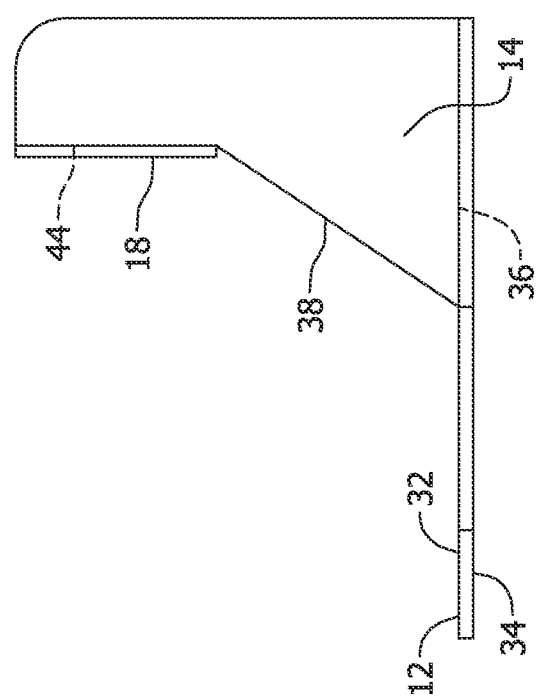
FIG. 4 is a side view of the mount. It is a representation of a side elevation view of the right side of the mount as viewed in FIG. 2, with the left side of the mount being a mirror image thereof.

The base 12 is flat and has a rectangular configuration with a length dimension between a top or first end edge 22 of the base and an opposite bottom or second end edge 24 of the base. As represented in FIGS. 1 and 2, the first end edge 22 and the second end edge 24 have straight and parallel configurations. The base has a width dimension between a first side edge 26 of the base and an opposite second side edge 28 of the base. As represented in FIGS. 1 and 2, the first side edge 26 and the second side edge 28 have straight and parallel configurations. The base 10 has a flat top surface 32 and an opposite, flat bottom surface 34. Forward corners FC at the top of the base that join the first end edge 22 to the first side edge 26 and the second side edge 28 are rounded as represented in FIGS. 2 and 5. The rounded corners facilitate insertion of the base 12 underneath a roofing shingle as will be explained.

The first support panel 14 has a portion with a general triangular configuration as represented in FIGS. 1, 4, 5 and 6. The triangular portion of the first support panel 14 is joined integrally to the base 12 along a base edge 36 that is formed from a straight bend line 36 between the first support panel 14 and the base 14. The triangular portion of the first support panel 14 is defined by the base edge 36 of the first support panel that extends straight along a portion of the first side edge 26 of the base 12. The triangular portion of the first support panel 14 also has an upper edge 38 that is a straight edge that extends at an angle from the first side edge 26 of the base 12. The first support panel 14 has a lower edge 42 that is a straight edge that extends at a right angle from the first side edge 26 of the base 12 and is parallel with and an extension of the second end edge 24 of the base. The triangular configuration of the first support panel 14 is defined by the base edge 36, the upper edge 38 and the lower edge 42 and is integrally connected with the rail panel 18 at a straight bend line 44 at an opposite side of the triangular configuration from the base 12.

The second support panel 16 also has a portion with a triangular configuration that is represented in FIGS. 1 and 5 and is constructed in the same manner as the first support panel 14 described above. The triangular portion of the second support panel 16 is a mirror image of the triangular portion of the first support panel 14 and is defined by a base edge 46 of the second support panel that extends straight along a portion of the second side edge 28 of the base 12. The second support panel 16 also has an upper edge 48 that extends at an angle from the second side edge 28 of the base 12. The second support panel 16 has a lower edge 52 that extends at a right angle from the second side edge 28 of the base 12 and is parallel with and an extension of the second end edge 24 of the base. The triangular configuration of the second support panel 14 is integrally connected to a small rectangular portion 54 at the apex of the triangular configuration. In the functional configuration of the mount 10 represented in FIGS. 2, 3, 4, 5, 6 and 7, the rectangular portion 54 is connected with the rail panel 18 by tack welding, by mechanical fasteners or by other equivalent means.

The rail panel 18 has a rectangular configuration that extends from the apex portion of the triangular configuration of the first support panel 14 at the bend line 44 joining the rail panel 18 to the first support panel 14. In the functional configuration of the mount 10, the rail panel 18 extends from the bend line 44 at the apex portion of the first support panel 14, across and above the base 12 to the rectangular portion 54 of the second support panel 16 and is secured thereto, as previously described. The rail panel 18 has a first fastener hole FH therethrough adjacent the first support panel 14 and a second fastener hole FH therethrough adjacent the second support panel 16. The rail panel 18 having two fastener holes FH enables the rail panel 18 to attach to and reinforce a rail in a horizontal orientation of the rail in a manner that is not possible with only a single fastener hole. A single fastener hole cannot prevent pivoting movement of a rail about the fastener in the single fastener hole where two fastener holes with two fasteners prevent pivoting movement and prevent movement in general of the rail relative to the rail panel 18 and the mount 10.

FIGS. 1, 3, 4, 5, 6 and 7 represent the three-dimensional functional configuration of the mount 10. As represented, the first support panel 14 is bent along the base edge 36 and extends upward from the first side edge 26 of the base 12 at a right angle or perpendicular to the top surface 32 of the base. The second support panel 16 is bent along the base edge 46 and extends upward from the second side edge 28 of the base 12 at a right angle or perpendicular to the top surface 32 of the base. The rail panel 18 is bent along the bend line 44 and extends at a right angle or perpendicular to the first support panel 14, across and above the top surface 32 of the base 12 to the second support panel 16. The distal end of the rail panel 18 from the bend line 44 is bent at a right angle as shown in FIG. 2 and is secured by fasteners, by welding or by other equivalent means to the small rectangular portion 54 of the second support panel 16 in the functional three-dimensional configuration of the mount.

Figure 6:
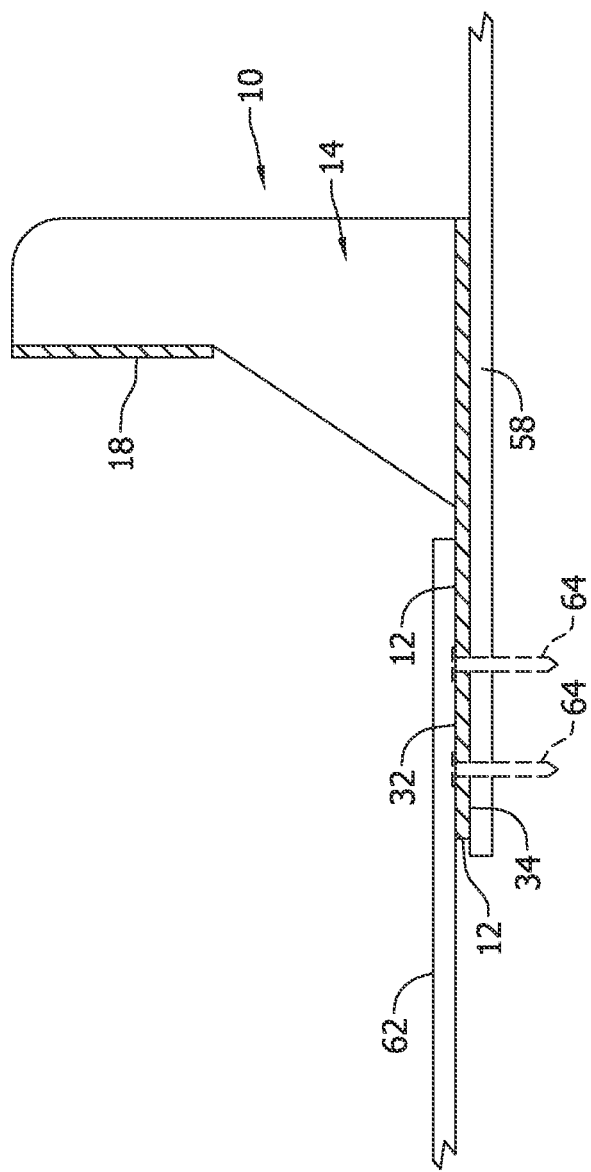
FIG. 6 is a side profile of the mount as it fits between layers of roofing shingles and all fastener penetrations located within the base portion which are entirely shielded by a shingle.
Figure 7:
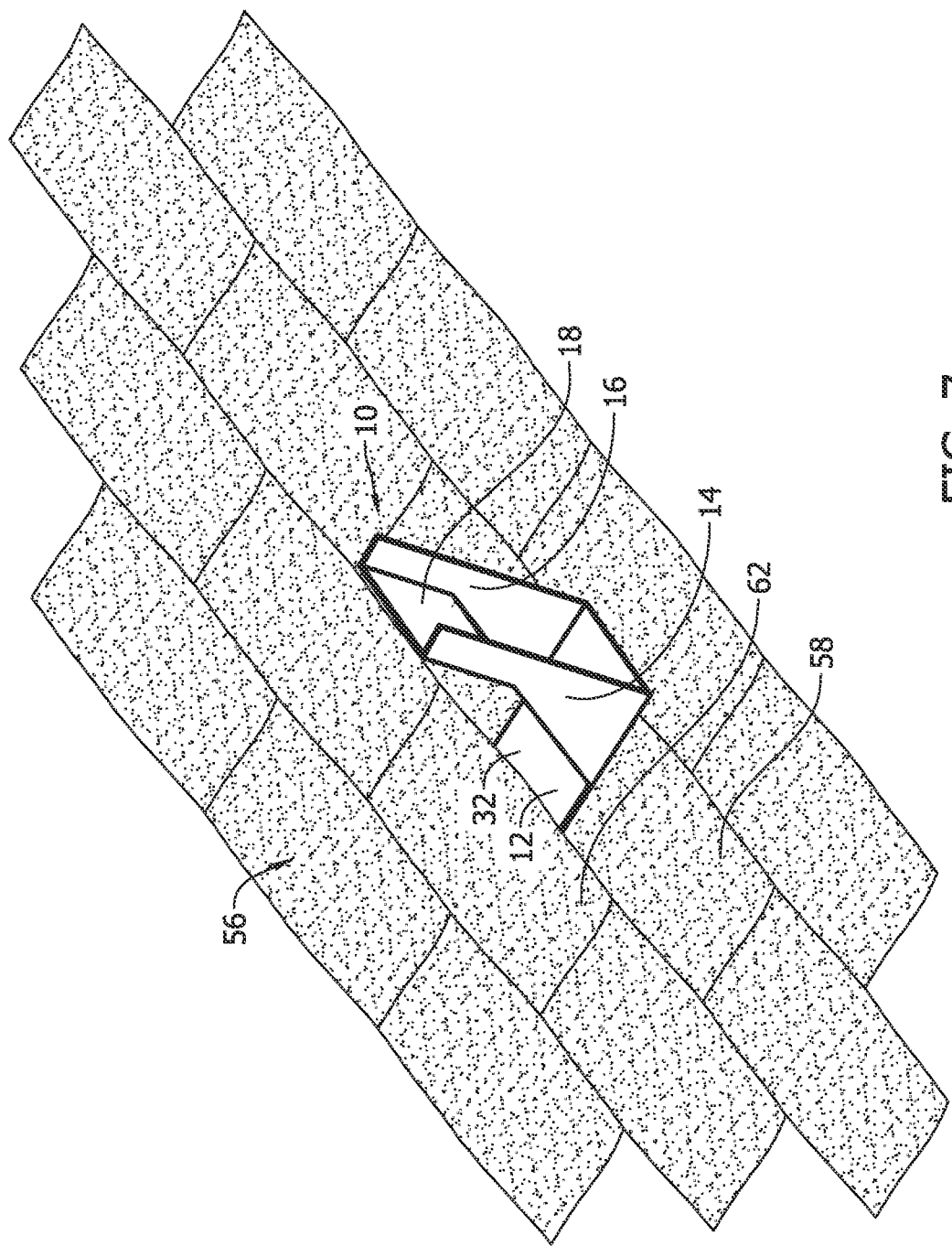
FIG. 7 is a three-dimensional representation of a mount as it is on a roof, with its fasteners concealed by existing shingles.

FIGS. 6 and 7 show representations of a right side elevation view of the mount 10 of FIG. 2 in its functional configuration attached to a shingled roof surface 56. In FIGS. 6 and 7 the top or apex of the roof surface 56 is to the left. The mount 10 is installed between a lower shingle 58 and an adjacent and overlapping upper shingle 62. In installing the mount 10, the lower edge of the upper shingle 62 is manually raised to provide access beneath the upper shingle 62 and between the lower shingle 58 and the upper shingle 62. As represented in FIGS. 6 and 7, the mount 10 is positioned on the roof surface 56 with the bottom surface 34 of the base 12 engaged against and on top of the lower shingle 58. The mount 10 is then moved upward inserting the top edge or first end edge 22 of the base beneath the upper shingle 62. The rounded forward corners FC of the base 12 facilitate the insertion of the base beneath the upper shingle 62. The first end edge 22 of the base 12 is moved beneath the upper shingle 62 until the upper shingle 62 covers over the fastener holes FH in the base 12. As represented by dashed lines in FIG. 6, fasteners 64 are extended through the fastener holes FH in the base 12 and into the roof structure. The fasteners 64 extend through the lower shingle 58 and are secured into a supporting structure of the roof surface 56 beneath the lower shingle 58. For example, the fasteners 64 could extend through the wood panels of the roof structure or through the wood panels and into a truss of a frame supporting the roof surface 56. The fasteners 64 are also overlapped by or positioned beneath the upper shingle 62. In this manner, the upper shingle 62 extends over the base 12 at the first end edge 22 of the base and over the fasteners 64 extending through the base 12. The upper shingle 62 thereby seals and protects the fasteners 64 and the fastener holes FH through the base 12 from melting snow or rain water accessing the fasteners and the fastener holes and possibly leaking through the fastener holes. Thereby, the simplified construction of the mount 10 provides an inexpensive and simple to install mount for a photovoltaic panel or solar cell on a shingled roof that prevents leakage of melting snow or rainwater through the roof.

Variations or modifications of the mount of this disclosure may occur to those skilled in the art upon review of the disclosure provided herein. Such variations, within the spirit of this invention, are intended to be encompassed within the scope of any claims to patent protection to be obtained. The description of the invention as set forth herein, and as shown in the drawings, are intended to be set forth for illustrative purposes only.

The invention claimed is:

1. A roof mount for installing a solar array onto an asphalt a shingle roof, the roof mount comprising:
a base with at least one opening through the base to accommodate a fastener to secure the roof mount to a roof surface, the base having a flat bottom surface and a flat top surface on opposite sides of the base, the base being configured with a low profile that enables a shingle positioned above the base to lay down on the base, the base being configured with a width that provides strength to resist dynamic forces such as wind lift, the base flat bottom surface being configured for surface engagement on a surface of a roof and the base flat top surface being configured for surface engagement under a shingle of the roof positioned in surface engagement on the flat top surface of the base, the at least one opening being positioned on the base and configured for being located entirely under the shingle positioned on the flat top surface of the base and over the at least one opening whereby the at least one opening and a fastener in the at least one opening are concealed beneath the shingle.

2. The roof mount of claim 1, further comprising:
a first support panel and a second support panel extending upward from the base;
a rail panel connected between the first support panel and the second support panel, the rail panel being configured so that no planes of formation will create or cause to be created a moisture dam.

3. The roof mount of claim 2, further comprising:
a first fastener hole and a second fastener hole through the rail panel, the first fastener hole and the second fastener hole being configured for receiving fasteners attaching the rail panel to a rail.

4. A mount for installing a photovoltaic panel on a shingle roof, the mount comprising:
a base, the base being flat and having a rectangular configuration with a length dimension between a first end edge and a second end edge of the base, and a width dimension between a first side edge and a second side edge of the base;

the base having a flat top surface extending from the first end edge to the second end edge of the base and extending from the first side edge to the second side edge of the base;

the base having a flat bottom surface extending from the first end edge to the second end edge of the base and extending from the first side edge to the second side edge of the base;

the base being configured with a low profile that enables a shingle positioned above the base to lay down on the base, the base being configured with a width that provides strength to resist dynamic forces such as wind lift;

a first support panel, the first support panel being flat and being connected to the first side edge of the base, the first support panel extending at a right angle upward from the base; and a rail panel, the rail panel being flat and being connected to the first support panel above the base, the rail panel extending at a right angle from the first support panel over the base.

5. The mount of claim 4, further comprising:
a second support panel, the second support panel being flat and being connected to the second side edge of a base, the second support panel extending at a right angle upward from the base; and
the rail panel being connected to the second support panel above the base.

6. The mount of claim 5, further comprising:
the first support panel being connected to the first side edge of the base adjacent to the second end edge of the base; and
the second support panel being connected to the second side edge of the base adjacent to the second end edge of the base.

7. The mount of claim 6, further comprising:
the rail panel extending between the first support panel and the second support panel and spaced above the base by the first support panel and the second support panel.

8. The mount of claim 7, further comprising:
the base, the first support panel, the second support panel and the rail panel being unitary and integrally connected.

9. The mount of claim 7, further comprising:
at least one fastener hole through the base, the at least one fastener hole being positioned on the base and configured for being covered over by a shingle engaging in surface engagement on the flat top surface of the base;
a first rail fastener hole through the rail panel and adjacent the first support panel; and
a second rail fastener hole through the rail panel and adjacent the second support panel.

10. The mount of claim 7, further comprising:
the first support panel having a planar configuration;
the second support panel having a planar configuration; and
the planar configuration of the first support panel and the planar configuration of the second support panel being parallel.

11. A mount for supporting a solar cell on a roof structure, the mount comprising:
a base, the base being configured as a flat sheet having a flat top surface and an opposite flat bottom surface;
a first support panel extending upward from the base and upward from the flat top surface of the base;
a second support panel extending upward from the base and upward from the flat top surface of the base; and
a rail panel extending between the first support panel and the second support panel across the flat top surface of the base.

12. The mount of claim 11, further comprising:
a first rail fastener hole through the rail panel and adjacent the first support panel; and
a second rail fastener hole through the rail panel and adjacent the second support panel.

13. The mount of claim 11, further comprising:
the first support panel having a planar, flat sheet configuration;
the second support panel having a planar, flat sheet configuration; and
the planar configuration of the first support panel and the planar configuration of the second support panel being parallel.

14. The mount of claim 11, further comprising:
the base, the first support panel, the second support panel and the rail panel are all unitarily connected.

15. The mount of claim 11, further comprising:
the base being configured for insertion of the base between a lower shingle and an upper shingle of an overlapping pair of shingles.

16. The mount of claim 11, further comprising:
the bottom surface of the base is configured for engagement in surface contact with a top surface of a lower shingle of an overlapping upper shingle and lower shingle;
the top surface of the base is configured for engagement in surface contact with a bottom surface of the upper shingle.

17. The mount of claim 11, further comprising:
the first support panel and the second support panel position the rail panel spaced upward from the top surface of the base.

18. The mount of claim 11, further comprising:
the base having a rectangular configuration with a top edge and an opposite bottom edge, and a first side edge and an opposite second side edge, the top edge, the bottom edge, the first side edge and the second side edge extending around the base;
the first support panel extending upward from the first side edge of the base at a right angle orientation to the top surface of the base;
the second support panel extending upward from the second side edge of the base at a right angle orientation to the top surface of the base;
the rail panel extending from the first side panel at a right angle orientation to the first side panel; and
the rail panel extending from the second side panel at a right angle orientation to the second side panel.

19. The mount of claim 11, further comprising:
the first support panel is connected to the base along a bend line between the first support panel and the base; and
the second support panel is connected to the base along a bend line between the second support panel and the base.

20. The mount of claim 19, further comprising:
the rail panel is connected to the first support panel along a bend line between the rail panel and the first support panel.

* * * * *